US010496952B2

(12) United States Patent
Lavery et al.

(10) Patent No.: US 10,496,952 B2
(45) Date of Patent: Dec. 3, 2019

(54) ARRANGEMENT FOR, AND METHOD OF, LOCATING PRODUCT TAGS BY LOCATING USERS WHO ARE OPERATING MOBILE READERS FOR READING THE PRODUCT TAGS

(71) Applicant: SYMBOL TECHNOLOGIES, LLC, Lincolnshire, IL (US)

(72) Inventors: Richard J. Lavery, Huntington, NY (US); Russell E. Calvarese, Stony Brook, NY (US); Charles Lauria, Miller Place, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 274 days.

(21) Appl. No.: 15/055,727

(22) Filed: Feb. 29, 2016

(65) Prior Publication Data
US 2017/0249584 A1 Aug. 31, 2017

(51) Int. Cl.
G06Q 10/08 (2012.01)
H04W 4/80 (2018.01)
G06K 7/10 (2006.01)
G06K 17/00 (2006.01)
H04L 29/08 (2006.01)

(52) U.S. Cl.
CPC ....... *G06Q 10/087* (2013.01); *G06K 7/10386* (2013.01); *G06K 17/0022* (2013.01); *G06Q 10/08* (2013.01); *H04W 4/80* (2018.02); *G06K 2007/10524* (2013.01); *H04L 67/12* (2013.01)

(58) Field of Classification Search
USPC .......................................... 235/385; 340/10.1
See application file for complete search history.

(56) References Cited

U.S. PATENT DOCUMENTS

| 5,317,318 | A | 5/1994 | Thomas et al. |
| 5,629,981 | A | 5/1997 | Nerlikar |
| 8,884,744 | B2 | 11/2014 | Bellows et al. |
| 2004/0100384 | A1 | 5/2004 | Chen et al. |
| 2004/0105006 | A1* | 6/2004 | Lazo ............... G01S 3/7864 348/169 |
| 2004/0160322 | A1 | 8/2004 | Stilp |
| 2005/0114154 | A1 | 5/2005 | Wolkowicz et al. |
| 2006/0267731 | A1 | 11/2006 | Chen |

(Continued)

FOREIGN PATENT DOCUMENTS

KR 20100041058 A 4/2010

OTHER PUBLICATIONS

International Search Report and Written Opinion for corresponding International Patent Application No. PCT/US2016/067512 dated Mar. 14, 2017.

(Continued)

*Primary Examiner* — Rafferty D Kelly
(74) *Attorney, Agent, or Firm* — Yuri Astvatsaturov

(57) ABSTRACT

A user moves about a venue, and operates a mobile reader to read a product tag in a read zone of the mobile reader. An identifier, such as a user identity badge, is associated with the user to identify the user. A sensing system is deployed in the venue for sensing the location of the identifier. A host server associates the mobile reader with the identifier of the user operating the mobile reader, and determines a location of the product tag in the venue based on the read zone and the location of the identifier.

20 Claims, 6 Drawing Sheets

(56) References Cited

U.S. PATENT DOCUMENTS

| | | |
|---|---|---|
| 2006/0290519 A1 | 12/2006 | Boate et al. |
| 2007/0205861 A1 | 9/2007 | Nair et al. |
| 2009/0160638 A1 | 6/2009 | Jesme |
| 2009/0315678 A1* | 12/2009 | Padmanabhan .......... H04Q 9/00 340/10.1 |
| 2012/0268239 A1 | 10/2012 | Ljung et al. |
| 2014/0159872 A1 | 6/2014 | Bekritsky et al. |

OTHER PUBLICATIONS

Ultrasonic Transducer, Wikipedia (Jan. 30, 2016) [Retrieved from Internet on Mar. 3, 2017—https://en.wikipedia.org/w/index.php?title=Ultrasonic_transducer&oldid=702374991].

* cited by examiner

ARRANGEMENT FOR, AND METHOD OF, LOCATING PRODUCT TAGS BY LOCATING USERS WHO ARE OPERATING MOBILE READERS FOR READING THE PRODUCT TAGS

BACKGROUND OF THE INVENTION

The present disclosure relates generally to an arrangement for, and a method of, locating product tags associated with products in a venue, and, more particularly, to locating the product tags by locating users who are operating handheld, mobile readers for reading the product tags.

It is known to deploy a radio frequency (RF) identification (RFID) system in a retail, factory, or warehouse environment, or a like venue, for product locationing, product tracking, product identification, and inventory control. For example, in order to take an inventory of products associated with RFID product tags in a warehouse environment or venue, it is known to position a plurality of RFID tag readers at fixed, overhead locations in the venue, and then, to operate each such overhead reader, under the control of a network computer or host server, to transmit and receive RF signals over a relatively long, reading range, e.g., over twenty feet, to any such product tags to read their payloads. A multitude of product tags may be in the reading range of each reader. A specific location of any particular RFID-tagged product in the venue is typically determined by having the server process the payloads and capture data from a plurality of the overhead readers by using triangulation/trilateration techniques known in the art.

Although the known RFID system has been generally satisfactory, its performance could sometimes suffer and degrade when, for example, multiple RFID-tagged products are stacked closely together, thereby making any one individual product more difficult to isolate and read, and/or are positioned on metal shelving structures, or near walls, of the venue. In such cases, the RF signals are often reflected and/or scattered off these structures and walls along multiple paths, thereby reducing the capability of the readers of accurately locating the product tags. To help alleviate this performance degradation, handheld, user-operated, mobile, RFID tag readers are sometimes used in conjunction with the overhead RFID tag readers. The handheld, mobile readers typically have a shorter reading range, e.g., up to about ten feet, and since they can be brought more closely to, and targeted more directly at, individual products, a successful reading of each individual product is more likely, with a lesser likelihood that any RF signal will be reflected and/or scattered off walls and/or structures of the venue.

One drawback in using the handheld, mobile reader is that its location in the venue during reading of the product tags is not known, i.e., does not have a fixed position, and, therefore, although a product tag can typically be more accurately read by the mobile reader, the location of that product tag is likewise unknown. The art has proposed inferring the location of the product tag by locating the mobile reader. However, this requires the mobile reader to be specially configured and modified, and a special locationing system to be installed at the venue so that the modified mobile reader can be located and, in turn, so that the product tag and its associated product can be located relative to the mobile reader.

For example, it is known to deploy an ultrasonic locationing system in the venue for this purpose. The ultrasonic locationing system deploys a plurality of ultrasonic transmitters, e.g., speakers, preferably at fixed, overhead locations in the venue, and drives the speakers, under the control of the host server, to determine the location of any such mobile reader that contains an ultrasonic receiver, e.g., a microphone. Each ultrasonic speaker transmits an audio signal or ultrasonic energy in a short burst which is received by the microphone on the mobile reader, thereby establishing the presence and specific location of each mobile reader within the venue, again using triangulation/trilateration techniques known in the art. However, although the known ultrasonic locationing system has been generally satisfactory, its presence and installation add to overall system complexity and expense. In addition, the requirement to specially configure and modify the mobile reader also adds to system complexity and expense.

Accordingly, it would be desirable to reduce overall system complexity and expense, to avoid having to install and operate an additional locationing system such as an ultrasonic locationing system at a venue, to avoid having to specially configure and modify a mobile reader, and to accurately locate a product tag without having to first find the location of the mobile reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
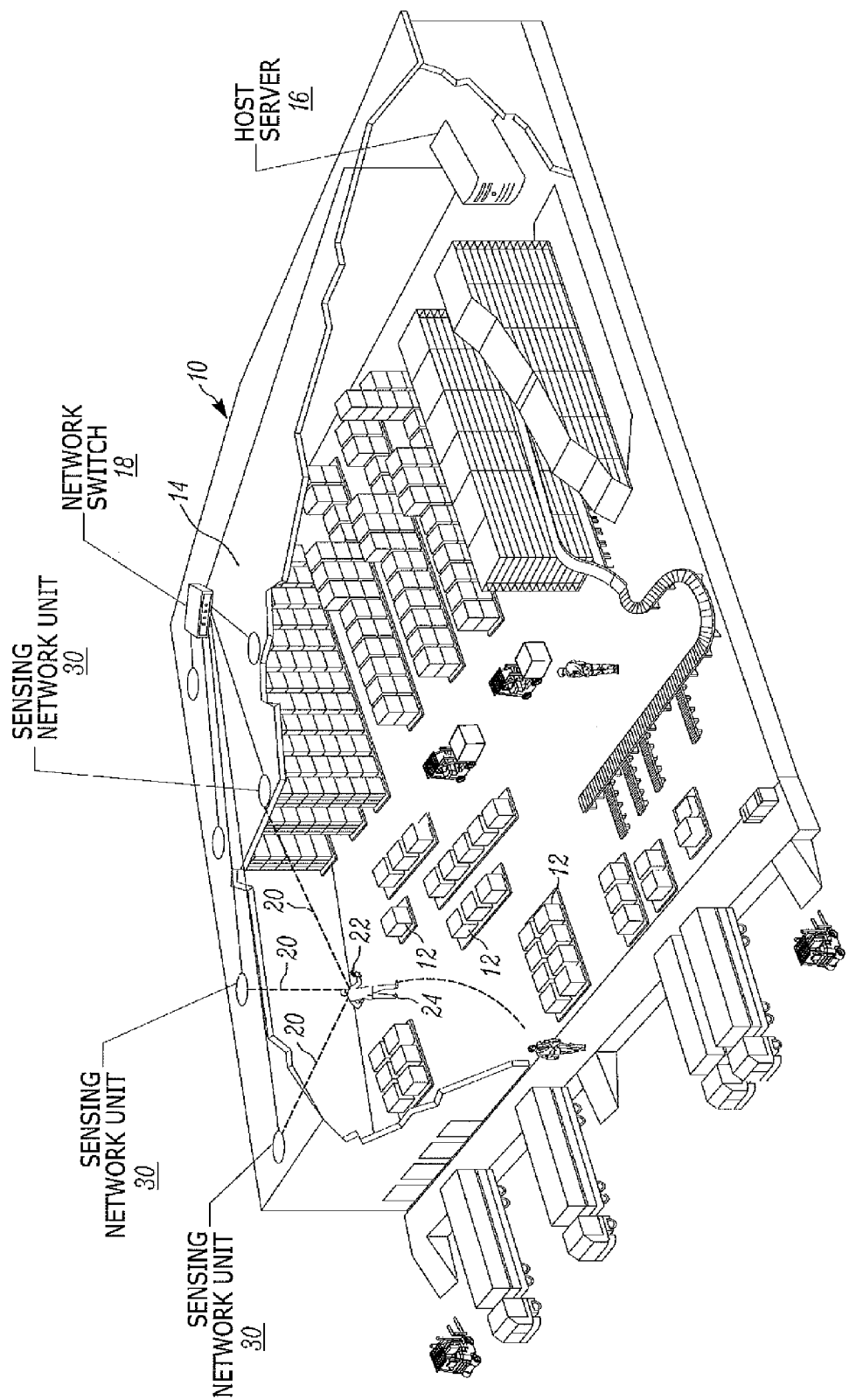
FIG. 1 is a broken-away, perspective view, as seen from above, of an arrangement for locating a product tag in accordance with the present disclosure by locating a user in a warehouse venue in which multiple, overhead, sensing network units are deployed.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for locating a product tag associated with a product in a venue, such as a retail, factory, or warehouse environment. The arrangement includes a mobile reader that is operated by a user in the venue, and that reads the product tag in a read zone that extends between the mobile reader and the product tag. An identifier, such as an identity badge, is associated, and is jointly movable in the venue, with the user. The identifier identifies the user. A sensing system is deployed in the venue, and is operative to sense the location of the identifier. A host server is operatively connected to the mobile reader and the sensing system. The server associates the mobile reader with the identifier of the user who is operating the mobile reader, and also determines the location of the product tag in the venue based on the read zone and the location of the identifier.

In one embodiment, the identifier includes a radio frequency (RF) identification (RFID) identifier tag, and the sensing system is an RFID system operative for locating the identifier by reading the RFID identifier tag on the identifier. In another embodiment, the identifier includes an ultrasonic receiver, and the sensing system is an ultrasonic locationing system operative for locating the identifier by transmitting an ultrasonic signal to the ultrasonic receiver on the identifier. In still another embodiment, the identifier includes a Wireless Fidelity (Wi-Fi) receiver, and the sensing system is a Wi-Fi system operative for locating the identifier by transmitting a Wi-Fi signal to the Wi-Fi receiver on the identifier. In yet another embodiment, the identifier includes a Bluetooth Low Energy (BLE) receiver, and the sensing system is a BLE system operative for locating the identifier by transmitting a BLE signal to the BLE receiver on the identifier. In an additional embodiment, the identifier includes an image, and the sensing system is a video system operative for locating the identifier by capturing the image on the identifier.

In a preferred embodiment, the sensing system is the above-described RFID system, and the identifier includes the above-described RFID identifier tag. In addition, it is preferred if the mobile reader is a handheld, portable, RFID tag reader, and if the product tag is an RFID product tag. In operation, the RFID tag reader radiates an antenna field pattern having a forwardly-extending front lobe that constitutes the aforementioned read zone in which the RFID product tag is contained, and a rearwardly-extending back lobe or back zone in which the RFID identifier tag is contained. Thus, when the mobile RFID reader reads the RFID product tag, it also simultaneously reads the RFID identifier tag in order to associate the mobile reader with the identifier of the user operating the mobile reader.

A further aspect of this disclosure is directed to a method of locating a product tag associated with a product in a venue. The method is performed by operating a mobile reader by a user movable in the venue to read the product tag in a read zone that extends between the mobile reader and the product tag; by associating an identifier with the user to identify the user, the identifier being movable with the user in the venue; by sensing the location of the identifier; by associating the mobile reader with the identifier of the user operating the mobile reader; and by determining the location of the product tag in the venue based on the read zone and the location of the identifier.

In accordance with this disclosure, a product tag is accurately located without having to first find the location of the mobile reader, and without having to install and operate an additional locationing system to locate the mobile reader, and without having to specially configure and modify the mobile reader. Instead, the user is located by his/her identifier that is carried and/or supported and/or worn by the user, and the location of the product tag is determined based on the location of the identifier and the read zone. The overall system complexity and expense have been reduced, while improving system performance.

Turning now to the drawings, reference numeral 10 in FIG. 1 generally depicts a warehouse environment or venue in which products 12, shown in FIG. 1 as cuboid cartons for simplicity, are to be accurately located in accordance with this disclosure. As described below, a plurality of sensing network units 30 is mounted overhead, for example, on a ceiling 14. Advantageously, the sensing network units 30 can be installed every twenty to eighty feet or so in a square grid. A network computer or host server 16, typically locally located in a backroom at the venue 10, comprises one or more computers and is in wired, wireless, direct, or networked communication with each sensing network unit 30 through a network switch 18. The server 16 may also be remotely hosted in a cloud server. The server 16 may include a wireless RF transceiver that communicates with each sensing network unit 30. For example, Wireless Fidelity (Wi-Fi) and Bluetooth® are open wireless standards for exchanging data between electronic devices. The server 16 controls each sensing network unit 30.

Figure 2:
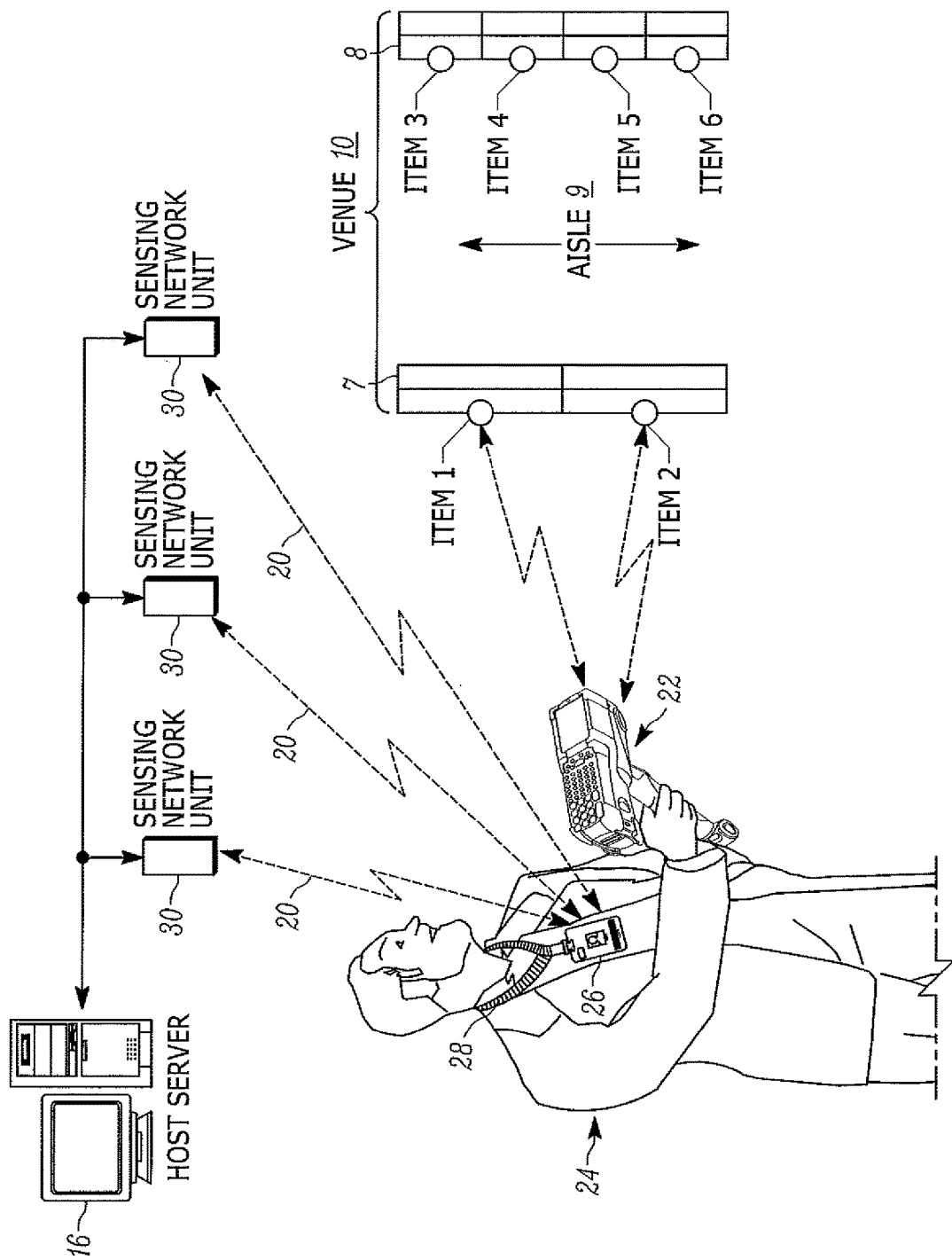
FIG. 2 is a view depicting a user operating a mobile reader to read product tags in the venue, and wearing an identity badge whose location is sensed by the sensing network units of FIG. 1.

As depicted in FIGS. 1-2, three of the sensing network units 30 can be used to locate an identifier 26, such as an identity badge (see FIG. 5), by triangulation or trilateration, as diagrammatically shown by dashed lines 20. The identifier 26 is associated, and jointly movable, with a user 24, e.g., by being supported and/or carried and/or worn by the user 24, for example, by being suspended from a neck strap 28. As described below, the identifier 26 can be any badge, token, garment or device capable of identifying the user 24. The user 24 is any person, employee, operator, or associate authorized to operate a handheld, mobile reader 22 operative for reading product tags associated with the products 12 or items in the venue 10.

The mobile readers 22 are preferably handheld, radio frequency (RF) identification (RFID) tag readers, but can also be handheld bar code symbol readers, phones, tablets, computers, or like data capture devices that are held and carried by the user 24 during his/her movement within the venue 10. Each product 12 is preferably tagged with an RFID product tag, preferably a passive RFID tag for cost reasons, and, in some applications, each RFID product tag may be associated with a pallet or a container for multiple products 12. The venue 10 may have any layout or configuration. As shown in FIG. 2, the venue 10 may have, for example, a plurality of shelving structures 7 and 8 separated by an aisle 9 in the venue 10, and a plurality of items 1-2 can be mounted on the shelving structure 7, and a plurality of other items 3-6 can be mounted on the shelving structure 8.

Figure 3:
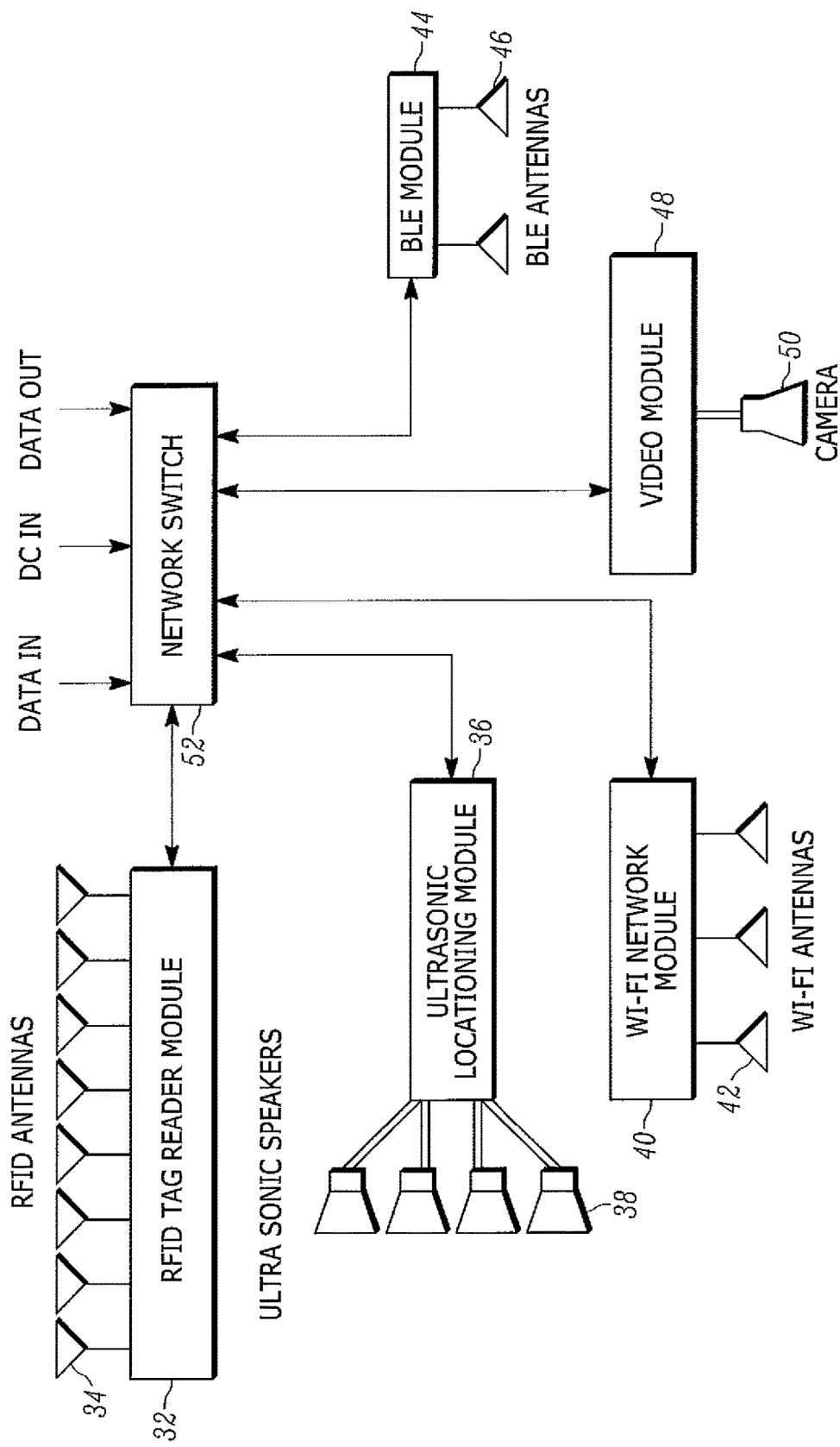
FIG. 3 is a block diagram of various sensing systems that could be mounted in one of the sensing network units of FIG. 1.

The block diagram of FIG. 3 depicts different sensing systems that can be mounted in each sensing network unit 30. One or more of these sensing systems can be operated to locate the identifier 26. In one embodiment, the identifier 26 includes a radio frequency (RF) identification (RFID) identifier tag or chip 60 (see FIG. 5), and the sensing system is an RFID system operative for locating the identifier 26 by reading the chip 60 on the identifier 26. More particularly, the RFID system includes an RFID tag reader module 32 that has control and processing electronics that are operatively connected to a plurality of RFID antennas 34, which are energized by the RFID module 42 to radiate an antenna field pattern. The RFID module 42 includes an RF transceiver operated, under the control of the server 16, to transmit an RF signal to the chip 60, and to receive an RF response signal from, the chip 60, thereby interrogating and processing the payload of the chip 60 that is in its coverage reading range. The payload or captured target data identifies the chip 60, and multiple sensing systems locate the identifier 26.

In another embodiment, the identifier 26 includes an ultrasonic receiver or chip 60, and the sensing system is an ultrasonic locationing system operative for locating the identifier 26 by transmitting an ultrasonic signal to the chip 60 on the identifier 26. More particularly, the locationing system includes an ultrasonic locationing module 36 having control and processing electronics operatively connected to a plurality of ultrasonic transmitters, such as voice coil or piezoelectric speakers 38, for transmitting ultrasonic energy to the chip 60 on the identifier 26. The receipt of the ultrasonic energy at the chip 60 locates the identifier 26. Each ultrasonic speaker 38 periodically transmits ultrasonic ranging signals, preferably in short bursts or ultrasonic pulses, which are received by the ultrasonic receiver, e.g., a microphone on the identifier 26. The microphone determines when the ultrasonic ranging signals are received. The locationing module 36, under the control of the server 16, directs all the speakers 38 to emit the ultrasonic ranging signals such that the microphone on the identifier 26 will receive minimized overlapping ranging signals from the different speakers 38. The flight time difference between the transmit time that each ranging signal is transmitted and the receive time that each ranging signal is received, together with the known speed of each ranging signal, as well as the known and fixed locations and positions of the speakers 38 on each sensing unit 30, are all used to determine the position of the microphone on the identifier 26, using a suitable locationing technique, such as triangulation, trilateration, multilateration, etc.

In still another embodiment, the identifier 26 includes a Wireless Fidelity (Wi-Fi) receiver or chip 60, and the sensing system is a Wi-Fi system operative for locating the identifier 26 by transmitting a Wi-Fi signal to the chip 60 on the identifier 26. More particularly, the Wi-Fi system includes a Wi-Fi network module 40 having control and processing electronics operatively connected to a plurality of Wi-Fi antennas 42. The Wi-Fi signal is transmitted to the chip 60 on the identifier 26. The receipt of the Wi-Fi signal at the chip 60 identifies the chip 60, and multiple sensing systems locate the identifier 26.

In yet another embodiment, the identifier 26 includes a Bluetooth Low Energy (BLE) receiver or chip 60, and the sensing system is a BLE system operative for locating the identifier 26 by transmitting a BLE signal to the chip 60 on the identifier 26. More particularly, the BLE system includes a BLE network module 44 having control and processing electronics operatively connected to a plurality of BLE antennas 46. The BLE signal is transmitted to the chip 60 on the identifier 26. The receipt of the BLE signal at the chip 60 identifies the chip 60, and multiple sensing systems locate the identifier 26.

In an additional embodiment, the identifier 26 includes an image 62 (see FIG. 5), and the sensing system is a video system operative for locating the identifier 26 by capturing the image 62 on the identifier 26. More particularly, the video system includes a video module 48 having camera control and processing electronics that is connected to a camera 50 for capturing the image 62 on the identifier 26. The camera 50 is advantageously a high-bandwidth, moving picture expert group (MPEG) compression camera. The capture of the image at the camera 50 is processed by the server 16 to locate the identifier 26.

It will be understood that each sensing network unit 30 need not have all or some of the above-described sensing systems, because any one sensing system will suffice. In the preferred embodiment, only the RFID system is employed to sense the location of the identifier 26. As also shown in FIG. 3, a networking control switch 52 is connected to each module 32, 36, 40, 44, 48, preferably by Power-over-Ethernet (PoE) cables, each PoE cable being operative to transmit electrical power and control data to and from the networking control switch 52 and each module 32, 36, 40, 44, 48.

Figure 4:
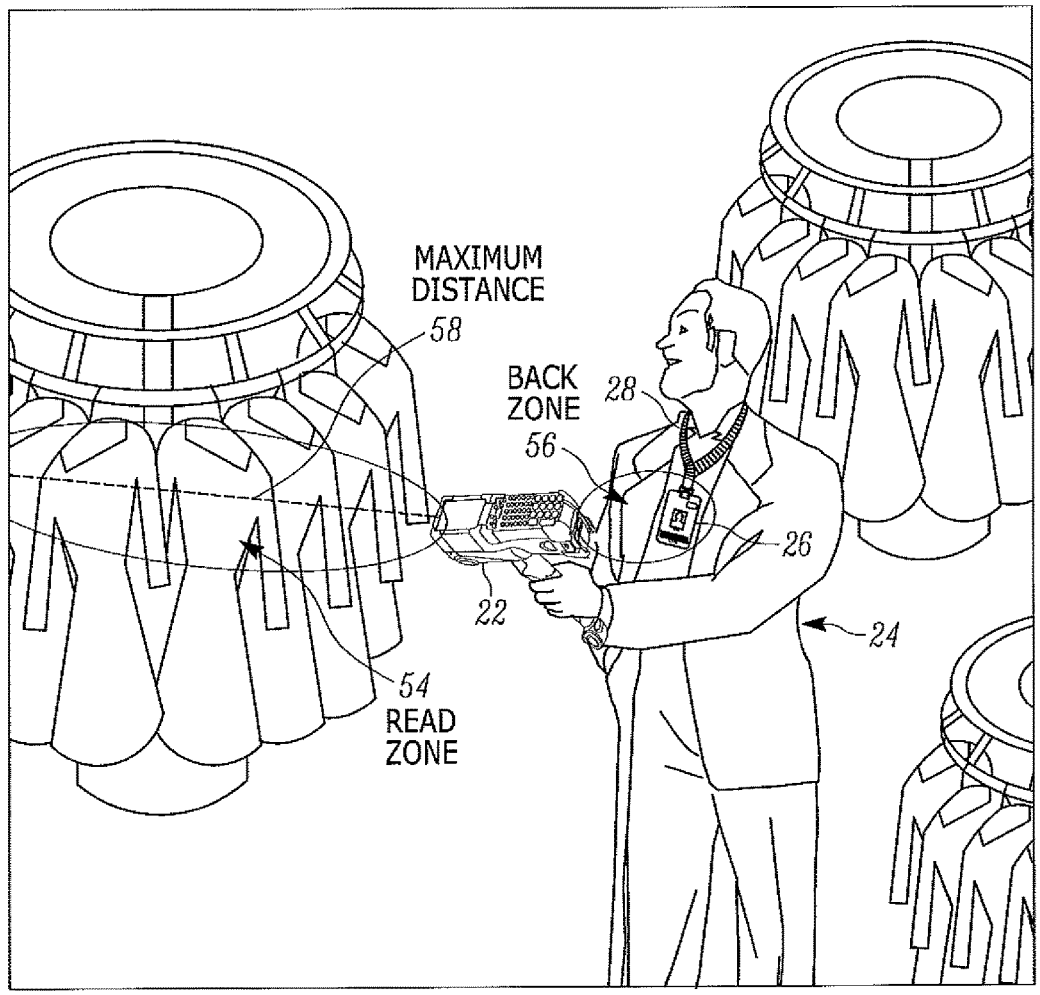
FIG. 4 is a view depicting another user operating a mobile reader to simultaneously read both product tags and the identity badge worn by the user.

FIG. 4 is similar to FIG. 2 in that another user 24 is depicted as wearing the identifier 26 suspended from a neck strap 28, and as holding and operating the mobile RFID tag reader 22 to read any RFID product tags located in a read zone 54. FIG. 4 also diagrammatically depicts an antenna field pattern radiated from the RFID tag reader 22. In operation, the RFID tag reader 22 radiates an antenna field pattern having a forwardly-extending, front lobe that constitutes the aforementioned read zone 54 in which each RFID product tag is contained, and a rearwardly-extending back lobe or back zone 56 in which the RFID identifier tag or chip 60 is contained. Thus, when the RFID tag reader 22 reads the RFID product tag, it also simultaneously reads the chip 60, thereby assisting the host server 16 in associating the mobile reader 22 with the identifier 26 of the user 24 operating the mobile reader 22. To insure that the RFID identifier tag or chip 60 is read in the back zone 56, this RFID identifier tag is preferably configured as a battery-assisted passive (BAP) tag. It is preferred that the RFID identifier tag or chip 60 be a single tag, although in some cases, it may be configured as two RFID identifier tags or chips.

The read zone 54 can be directional as shown, or omni-directional. The size of the read zone 54 can be fixed or variable, e.g., by modifying the magnitude or power level of the transmitted RF signal. As illustrated, the read zone 54 is generally elliptically shaped and has a major axis that extends away from the reader 22 to the product tag over a maximum distance or length 58. The read zone 54 is three-dimensional and also has a maximum height/width in mutually orthogonal directions perpendicular to the major axis. The host server 16 determines the location of the RFID product tag in the venue based not only on the location of the identifier 26, but also on the dimensions of the read zone 54. Thus, once the identifier 26 is located, the position of the RFID reader 22 is inferred to be in the immediate vicinity of the identifier 26, and the position of the RFID product tag is inferred to be within the maximum distance 58 of the read zone away from the RFID reader 22. The location of the RFID product tag may be refined by reading the RFID product tag multiple times and/or by varying the power level of the transmitted RF signal, and averaging the results.

Figure 5:
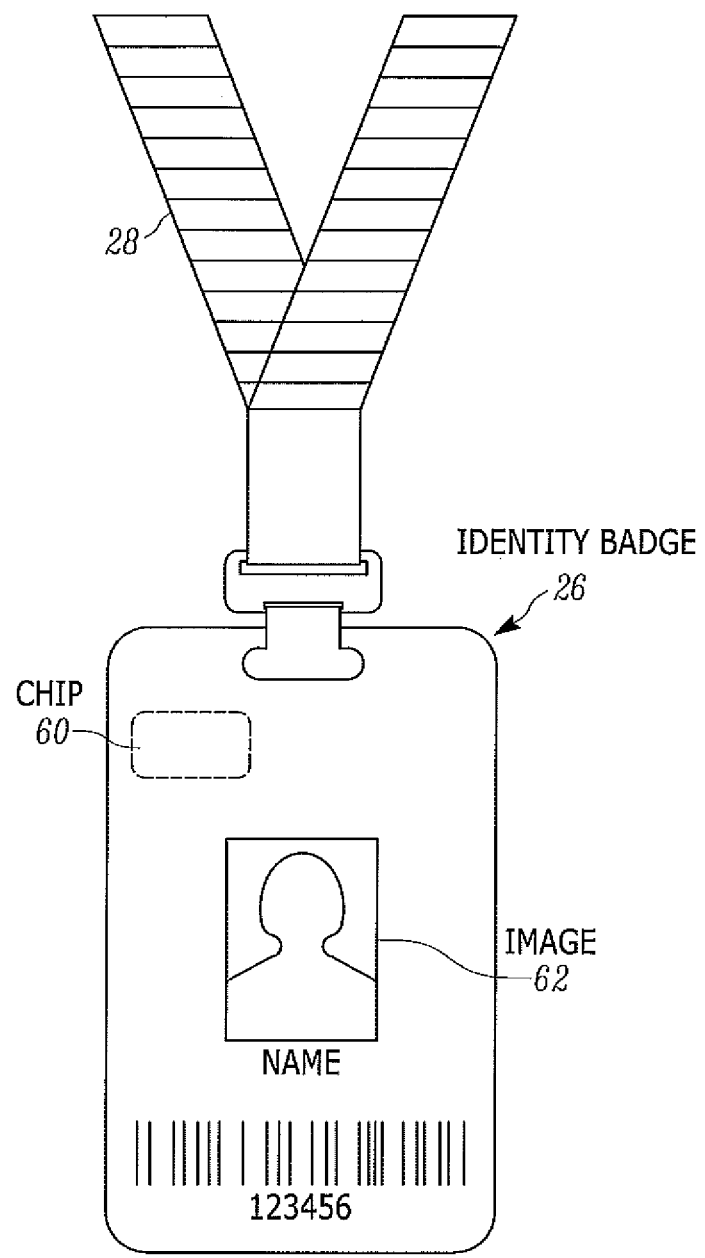
FIG. 5 is a close-up view of the identity badge of FIGS. 3-4.

As previously stated, the identifier 26 can be any badge, token, garment or device capable of identifying the user 24, and is not to be restricted only to the identity badge depicted in FIG. 5. The identifier 26 can be incorporated into a garment, such as a vest, hat, or other article of clothing; or can be incorporated into a badge clipped onto the user's shirt/blouse, pants/skirt, belt, etc; or can be incorporated into a wrist bracelet, necklace, etc. The identifier 26 can even be incorporated into an electronic device, such as a smartwatch, smartphone, or tablet, carried or worn by the user.

Figure 6:
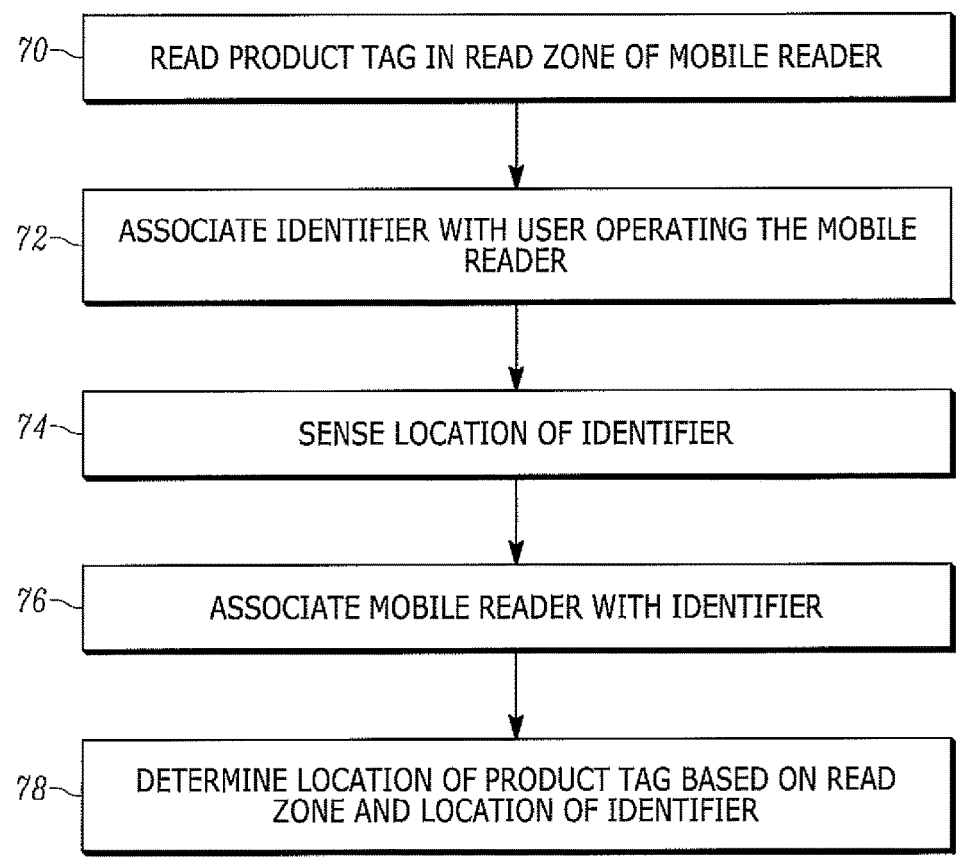
FIG. 6 is a flow chart of a method of locating a product tag by locating a user in accordance with the present disclosure.

The flow chart of FIG. 6 depicts the operation of the method of this disclosure. In step 70, the mobile reader 22 is operated by the user 24 in the venue 10 to read the product tag in a read zone that extends between the mobile reader 22 and the product tag. In step 72, the identifier 26 is associated with the user 24 to identify the user 24. The identifier 26 is jointly movable with the user 24 in the venue 10. In step 74, the location of the identifier 26 is sensed. In step 76, the mobile reader 22 is associated with the identifier 26 of the user 24 operating the mobile reader 22. In step 78, the location of the product tag in the venue 10 is determined based on the read zone and the location of the identifier 26.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A reader or structure that is "configured" in a certain way is configured in at least that way, but may also be configured in ways that are not listed.

It will be appreciated that some embodiments may be comprised of one or more generic or specialized processors (or "processing readers") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage reader, a magnetic storage reader, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for locating a product tag associated with a product in a venue, comprising:
   a mobile reader operated by a user in the venue, and operative for reading the product tag in a read zone that extends between the mobile reader and the product tag;
   an identifier associated, and jointly movable in the venue, with the user, and operative for identifying the user;
   a sensing system deployed in the venue, and operative for sensing a location of the identifier; and
   a host server operatively connected to the mobile reader and the sensing system, and operative for associating the mobile reader with the identifier of the user operating the mobile reader, and for determining a location of the product tag in the venue based on the read zone and the location of the identifier.

2. The arrangement of claim 1, wherein the identifier includes a radio frequency (RF) identification (RFID) identifier tag, and wherein the sensing system is an RFID system operative for locating the identifier by reading the RFID identifier tag on the identifier.

3. The arrangement of claim 1, wherein the identifier includes an ultrasonic receiver, and wherein the sensing system is an ultrasonic locationing system operative for locating the identifier by transmitting an ultrasonic signal to the ultrasonic receiver on the identifier.

4. The arrangement of claim 1, wherein the identifier includes a Wireless Fidelity (Wi-Fi) receiver, and wherein the sensing system is a Wi-Fi system operative for locating the identifier by transmitting a Wi-Fi signal to the Wi-Fi receiver on the identifier.

5. The arrangement of claim 1, wherein the identifier includes a low energy wireless receiver, and wherein the sensing system is a low energy wireless system operative for locating the identifier by transmitting a low energy wireless signal to the low energy wireless receiver on the identifier.

6. The arrangement of claim 1, wherein the identifier includes an image, and wherein the sensing system is a video system operative for locating the identifier by capturing the image on the identifier.

7. The arrangement of claim 1, wherein the mobile reader is a handheld, portable, radio frequency (RF) identification (RFID) tag reader for reading the product tag configured as an RFID product tag.

8. The arrangement of claim 7, wherein the identifier includes an RFID identifier tag, and wherein the reader is also operative for reading the RFID identifier tag to associate the mobile reader with the identifier of the user operating the mobile reader.

9. The arrangement of claim 1, wherein the sensing system includes a plurality of sensing units deployed overhead in the venue.

10. The arrangement of claim 1, wherein the identifier is a badge supported by the user.

11. A method of locating a product tag associated with a product in a venue, comprising:
operating a mobile reader by a user movable in the venue to read the product tag in a read zone that extends between the mobile reader and the product tag;
associating an identifier with the user to identify the user, the identifier being movable with the user in the venue;
sensing a location of the identifier;
associating the mobile reader with the identifier of the user operating the mobile reader; and
determining a location of the product tag in the venue based on the read zone and the location of the identifier.

12. The method of claim 11, and configuring the identifier with a radio frequency (RF) identification (RFID) identifier tag, and locating the identifier by reading the RFID identifier tag on the identifier.

13. The method of claim 11, and configuring the identifier with an ultrasonic receiver, and locating the identifier by transmitting an ultrasonic signal to the ultrasonic receiver on the identifier.

14. The method of claim 11, and configuring the identifier with a Wireless Fidelity (Wi-Fi) receiver, and locating the identifier by transmitting a Wi-Fi signal to the Wi-Fi receiver on the identifier.

15. The method of claim 11, and configuring the identifier with a low energy wireless receiver, and locating the identifier by transmitting a low energy wireless signal to the low energy wireless receiver on the identifier.

16. The method of claim 11, and configuring the identifier with an image, and locating the identifier by capturing the image on the identifier.

17. The method of claim 11, and configuring the mobile reader as a handheld, portable, radio frequency (RF) identification (RFID) tag reader for reading the product tag configured as an RFID product tag.

18. The method of claim 17, and configuring the identifier with an RFID identifier tag, and reading the RFID identifier tag to associate the mobile reader with the identifier of the user operating the mobile reader.

19. The method of claim 11, wherein the sensing is performed by deploying a plurality of sensing units overhead in the venue.

20. The method of claim 11, and configuring the identifier as a badge supported by the user.

* * * * *